United States Patent
Zhen et al.

(10) Patent No.: US 10,983,856 B2
(45) Date of Patent: Apr. 20, 2021

(54) IDENTIFYING ROOT CAUSES OF PERFORMANCE ISSUES

(71) Applicant: Microsoft Technology Licensing, LLC, Redmond, WA (US)

(72) Inventors: Yi Zhen, San Jose, CA (US); Yung-Yu Chung, Santa Clara, CA (US); Yang Yang, Fremont, CA (US); Bo Long, Palo Alto, CA (US)

(73) Assignee: Microsoft Technology Licensing, LLC, Redwood Shores, CA (US)

( * ) Notice: Subject to any disclaimer, the term of this patent is extended or adjusted under 35 U.S.C. 154(b) by 68 days.

(21) Appl. No.: 16/457,727

(22) Filed: Jun. 28, 2019

(65) Prior Publication Data

US 2020/0409781 A1 Dec. 31, 2020

(51) Int. Cl.
*G06F 11/00* (2006.01)
*G06F 11/07* (2006.01)

(52) U.S. Cl.
CPC .................. *G06F 11/079* (2013.01)

(58) Field of Classification Search
CPC ...................................... G06F 11/079
See application file for complete search history.

(56) References Cited

U.S. PATENT DOCUMENTS

| | | | | |
|---|---|---|---|---|
| 5,974,572 A * | 10/1999 | Weinberg | ............... | G06F 11/32 714/47.2 |
| 6,721,686 B2 * | 4/2004 | Malmskog | .......... | H04L 41/5083 702/122 |
| 8,276,123 B1 * | 9/2012 | Deng | .................... | G06F 11/368 717/125 |
| 8,392,890 B2 * | 3/2013 | Miller | ..................... | H04L 67/42 717/127 |
| 8,418,000 B1 * | 4/2013 | Salame | ............... | G06F 11/3684 714/38.1 |
| 9,009,676 B2 * | 4/2015 | Chua | .................... | G06F 11/3414 717/127 |
| 10,176,022 B2 * | 1/2019 | Altman | ............... | G06F 11/3414 |
| 10,216,608 B1 * | 2/2019 | Arguelles | ............ | G06F 11/3664 |
| 10,230,603 B2 * | 3/2019 | Lad | ..................... | H04L 41/0631 |
| 2017/0177416 A1 * | 6/2017 | Altman | ............... | G06F 11/3672 |
| 2018/0365091 A1 * | 12/2018 | Donaldson | .......... | G06F 11/0751 |

* cited by examiner

*Primary Examiner* — Jonathan D Gibson
(74) *Attorney, Agent, or Firm* — Hickman Becker Bingham Ledesma LLP

(57) ABSTRACT

The disclosed embodiments provide a system for identifying root causes of performance issues. During operation, the system obtains a call graph containing a set of call paths for a set of services. Next, the system determines, based on a load test of the set of services, severity scores for the set of services, wherein the severity scores represent levels of abnormal behavior in the set of services. The system then groups the severity scores by the set of call paths and identifies, based on the grouped severity scores, one or more services as potential root causes of performance issues in the set of services. Finally, the system outputs the identified one or more services as the potential root causes of the performance issues.

20 Claims, 5 Drawing Sheets

IDENTIFYING ROOT CAUSES OF PERFORMANCE ISSUES

BACKGROUND

Field

The disclosed embodiments relate to techniques for identifying performance issues. More specifically, the disclosed embodiments relate to techniques for identifying root causes of performance issues.

Related Art

Data centers and cloud computing systems are commonly used to run applications, provide services, and/or store data for organizations or users. Within the cloud computing systems, software providers deploy, execute, and manage applications and services using shared infrastructure resources such as servers, networking equipment, virtualization software, environmental controls, power, and/or data center space. Some or all resources can also be dynamically allocated and/or scaled to enable consumption of the resources as services.

On the other hand, an anomaly or failure in a server or data center can disrupt access to a service or a resource, potentially resulting in lost business for the company and/or a reduction in consumer confidence that results in a loss of future business. For example, high latency in loading web pages from the company's website can negatively impact user experience with the website and deter some users from returning to the website.

The distributed nature of web-based resources further complicates the accurate detection and analysis of performance anomalies and failures. For example, the overall performance of a website is affected by the interdependent execution of multiple services that provide data, images, video, user-interface components, recommendations, and/or features used in the website. As a result, aggregated performance metrics such as median or average page load times and/or latencies in the website are commonly calculated and analyzed without factoring in the effect of individual components or services on the website's overall performance.

Moreover, conventional techniques for monitoring and/or testing the performance of services or components in distributed systems require extensive manual configuration and/or review. For example, a site reliability engineer (SRE) performs a load test by routing traffic from one or more fabrics in a distributed system to a single fabric in the distributed system. During the load test, performance metrics are collected from services in the fabric. After the load test is complete, the SRE manually goes through performance metrics for hundreds or thousands of services to identify services with capacity issues that result in potential performance bottlenecks, failures, outages, and/or performance degradation. When the SRE fails to identify a service with capacity issues, a subsequent spike in traffic to the service can cause the service to experience extremely high latency or to go down, which disrupts the operation of the service and/or other services that depend on the service.

Consequently, management and use of data centers and/or distributed systems may be facilitated by mechanisms for improving the monitoring and/or detection of service performance issues.

BRIEF DESCRIPTION OF THE FIGURES

In the figures, like reference numerals refer to the same figure elements.

DETAILED DESCRIPTION

Figure 1:
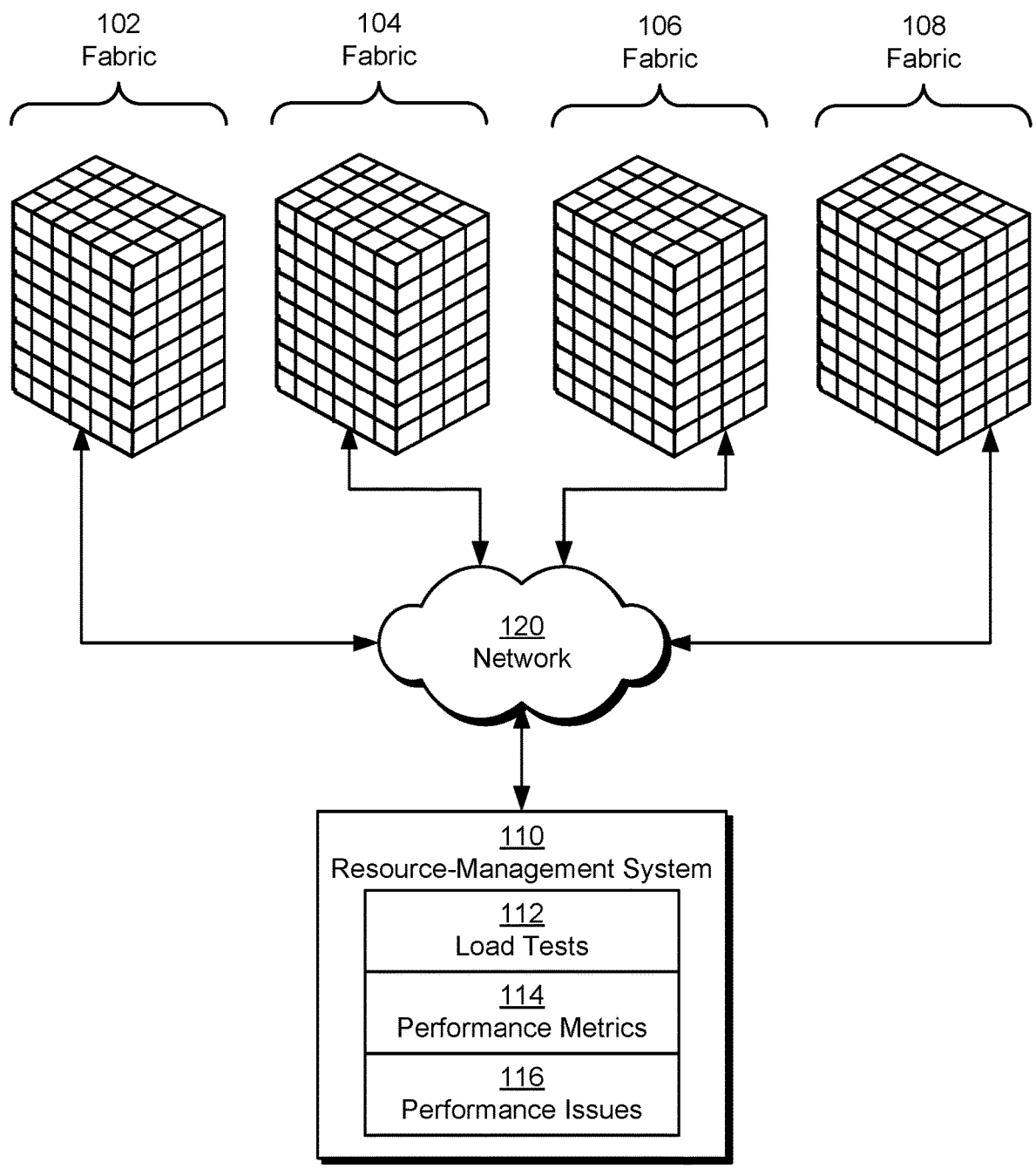
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for identifying performance issues. In these embodiments, services deployed in a set of fabrics are subjected to a load test, in which higher-than-normal volumes of traffic are directed to the services in a target fabric. Performance metrics are collected from the services during the load test and analyzed to identify a subset of the services as potential "hotspots" or root causes of abnormal behavior or latency in the services.

More specifically, the disclosed embodiments provide a method, apparatus, and system for identifying root causes of performance issues. After one or more load tests are performed, severity scores are calculated from the performance metrics for services subjected to the load test(s). Each severity score represents a degradation of a corresponding service's performance compared with an expected or "baseline" performance of the service. A higher severity score indicates a higher likelihood that the service is a root cause of latency, capacity issues (e.g., an inability to handle high volumes of queries or operations), and/or other performance issues. Each severity score is optionally weighted and/or adjusted based on a PageRank (PageRank™ is a registered trademark of Google Inc.) score and/or another measure of importance of the corresponding service generated from a call graph of the services.

A number of service endpoints with the highest severity scores are also identified. For example, a pre-specified number of service endpoints with the highest severity scores and/or a variable number of service endpoints with severity scores that exceed a threshold are identified. The identified service endpoints are grouped by call paths in the call graph, and one or more service endpoints with the highest severity scores in each call path are identified as potential root causes of performance issues. The identified service endpoints are then aggregated into the service level, and some or all of the services and/or service endpoints are outputted as potential "hotspots" or root causes of abnormal behavior or latency in the services.

By calculating severity scores for services based on deviations from normal behavior experienced during a load test, the disclosed embodiments identify performance issues in the services without requiring administrators or site reliability engineers (SREs) to manually review performance metrics for the services. The disclosed embodiments additionally group the services (or service endpoints) by call paths in a call graph and select individual services with the worst performance issues in each call path, thereby reducing false positives during root cause analysis of the performance issues. In turn, owners of the services are able to remedy latency, capacity, and/or other performance issues identified in the services, which improves the efficiency and performance of the services, other services in the same call paths, and/or computer systems or resource used to execute the services. Consequently, the disclosed embodiments improve computer systems, applications, user experiences, tools, and/or technologies related to load testing, capacity monitoring, root cause analysis, and/or managing or maintaining distributed services or systems.

Identifying Root Causes of Performance Issues

FIG. 1 shows a schematic of a system in accordance with the disclosed embodiments. The system includes a resource-management system 110 that manages resources in a number of fabrics 102-108. Fabrics 102-108 are found in data centers, collocation centers, points of presence (PoPs), cloud computing systems, clusters, content delivery networks, and/or other collections of processing, storage, network, input/output (I/O), and/or other resources. Resources in and across fabrics 102-108 are connected to one another over a network 120 such as a local area network (LAN), wide area network (WAN), personal area network (PAN), virtual private network, intranet, mobile phone network (e.g., a cellular network), Wi-Fi network (Wi-Fi® is a registered trademark of Wi-Fi Alliance), Bluetooth (Bluetooth® is a registered trademark of Bluetooth SIG, Inc.) network, universal serial bus (USB) network, Ethernet network, and/or switch fabric. The resources include processors, memory, storage, network, I/O, and/or other types of hardware provided by data center and/or computing fabrics 102-108.

In some embodiments, each fabric hosts a number of services, with each service implemented and/or accessed using a number of service endpoints. For example, a set of services for implementing one or more applications, websites, features, and/or online networks are deployed in and/or replicated across fabrics 102-108. Each service includes tens to hundreds of service endpoints that can be accessed using different Uniform Resource Locators (URLs), network addresses, and/or other types of references. Each service endpoint is further implemented using multiple physical and/or virtual hosts in a given fabric.

As shown in FIG. 1, resource-management system 110 includes functionality to perform load tests 112 of fabrics 102-108 and/or services in fabrics 102-108. During a load test, resource-management system 110 shifts traffic from one or more source fabrics 102-108 to one or more other target fabrics 102-108 and collects performance metrics 114 from the target fabrics. For example, resource-management system performs a load test of a target fabric by shifting traffic from all other fabrics to the target fabric. While the target fabric processes the increased load from the other fabrics, resource-management system 110 measures inbound and/or outbound latencies, queries per second (QPS), error counts, thread pool usages, central processing unit (CPU) usages, memory usages, garbage collection counts, garbage collection times, and/or other performance metrics 114 for various services and/or service endpoints in the target fabric.

Resource-management system 110 additionally includes functionality to identify root causes of performance issues 116 based on performance metrics 114 collected from services and/or service endpoints during load tests 112. As described in further detail below, performance issues 116 include increased latency, error counts, and/or other degradation in performance metrics 114 under increased loads. In turn, services or service endpoints that cause performance issues 116 represent performance bottlenecks and/or risks to related to system downtime or failures. Thus, by proactively identifying services and/or endpoints that are potential root causes of performance issues 116, resource-management system 110 allows owners of the services and/or endpoints to remedy performance issues 116 before failures, outages, and/or additional performance degradation occurs.

Figure 2:
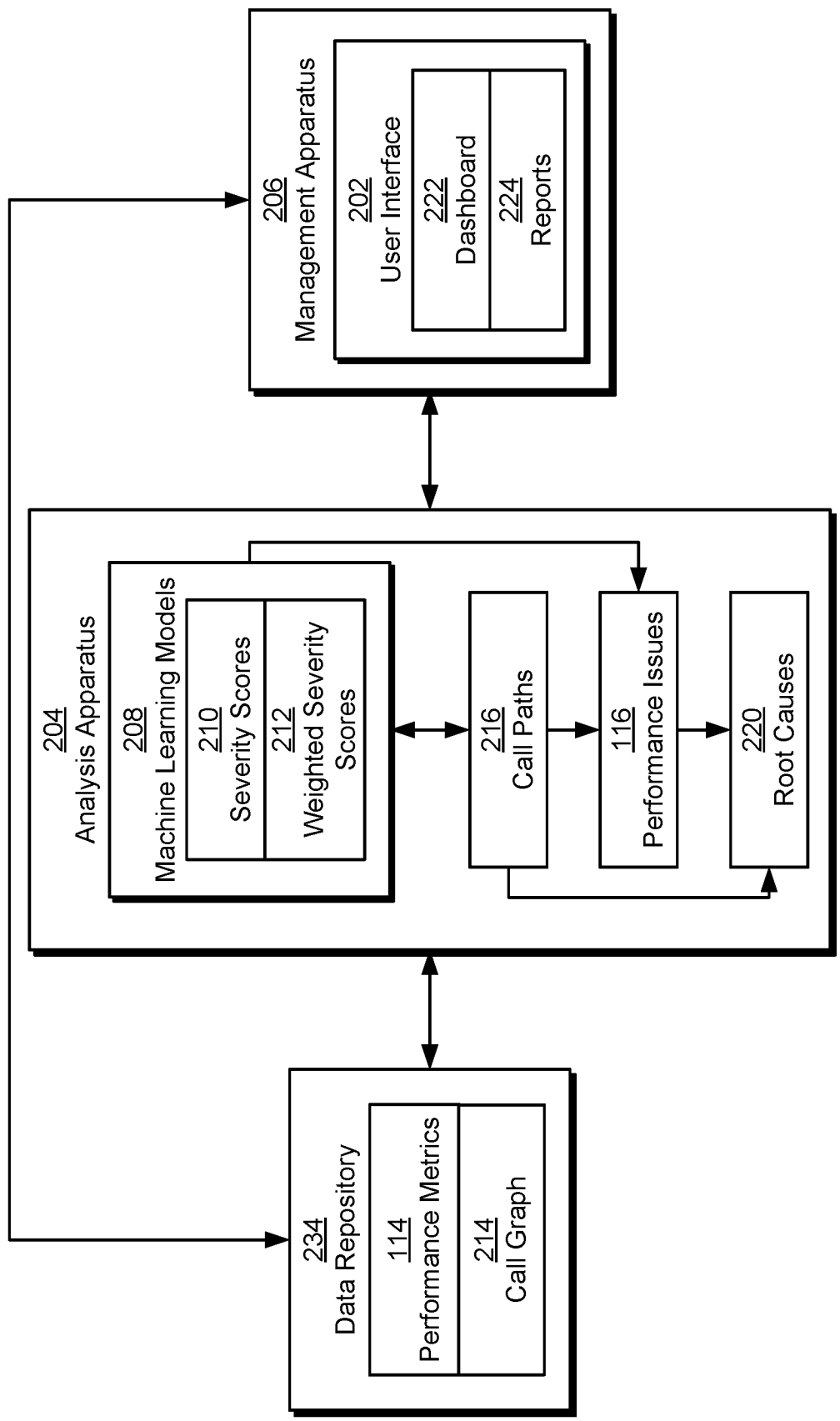
FIG. 2 shows a system for identifying root causes of performance issues in accordance with the disclosed embodiments.

FIG. 2 shows a system for identifying performance issues 116 (e.g., resource-management system 110 of FIG. 1) in accordance with the disclosed embodiments. As shown in FIG. 2, the system includes an analysis apparatus 204 and a management apparatus 206. Each of these components is described in further detail below.

Analysis apparatus 204 identifies root causes 220 of performance issues 116 in a target fabric (e.g., fabrics 102-108 of FIG. 1) and/or another collection of computing, storage, network, I/O, and/or other types of resources. As mentioned above, performance metrics 114 are collected from the target fabric during a load test that shifts traffic from other fabrics to the target fabric. In turn, analysis apparatus 204 uses performance metrics 114 and a call graph 214 of calling relationships among services, service endpoints, hosts, and/or other components executing in the target fabric to identify a subset of the components as potential root causes 220 of performance issues 116 in the target fabric.

More specifically, analysis apparatus 204 obtains performance metrics 114 and call graph 214 from a data repository 234. For example, analysis apparatus 204 obtains performance metrics 114 and call graph 214 from a relational database, data warehouse, filesystem, event stream, flat file, and/or another data store providing data repository 234 after performance metrics 114 and call graph 214 are generated by other components of the system. Analysis apparatus 204 also, or instead, performs a load test of the target fabric and generates performance metrics 114 and/or call graph 214 based on the load test.

Next, analysis apparatus 204 applies one or more machine learning models 208 to performance metrics 114 to produce severity scores 210 for the components. In some embodiments, each severity score represents the level of deviation or degradation in the performance of a corresponding component during a load test from an expected or "baseline" performance of the component. Thus, a higher severity score indicates a higher likelihood of performance issues 116 (e.g., inability to handle high QPSes and/or load) in the component, and a lower severity score indicates a lower likelihood of performance issues 116 in the component.

In one or more embodiments, analysis apparatus 204 uses one machine learning model to estimate normal traffic for the target fabric and another machine learning model to estimate one or more performance metrics 114 (e.g., latency, error count, thread pool usage, memory usage, CPU usage, garbage collection count, garage collection time, etc.) for each component in the target fabric, given the estimate of normal traffic. Analysis apparatus 204 calculates a severity score for the component based on the frequency with which the observed performance metrics 114 for the component during the load test exceed an upper limit to the expected or estimated performance metrics 114 generated by the second machine learning model.

For example, analysis apparatus 204 uses the following equation to calculate a severity score for a component:

$$s(e, t_1, t_2) = \sum_{t \in [t_1, t_2]} I[l_t > l_t^{-+}] \times s_t,$$

where $l_t$ is an observed performance metric (e.g., latency) of component e at time t, $l_t^{-+}$ is the upper limit on expected or "normal" performance at time t (e.g., a $95^{th}$ percentile of the normal performance), and I[X] is an indicator function that is set to 0 when the statement X is true and 0 otherwise. Moreover, $s_t=(l_t E[l_t])/\sigma_t$ is the severity score at time $t \in [t_1, t_2]$, where $E[l_t]$ and $\sigma_t$ are the expectation and standard deviation of normal performance at time t, respectively.

Continuing with the above example, analysis apparatus 204 builds a first machine learning model as a time-series traffic model for the target fabric with the following representation:

$$q_t = g(t)$$

In the above representation, $q_t$ represents the traffic model, and g(t) represents a deterministic function without variance. The traffic model is built using historical traffic data to the target fabric and thus accounts for seasonality in normal traffic to the target fabric. Because the load test of the target fabric involves a significant increase in traffic to the target fabric, the traffic model is also able to indicate the start and end of the load test.

Continuing with the above example, analysis apparatus 204 learns a second machine learning model as a latency model with the following representation:

$$l_t = f(q_t)$$

In the above representation, $f$ is an estimated function with variance, and $l_t$ and $q_t$ are the performance of the component and estimated traffic to the target fabric at time t, respectively. Because both the traffic and performance include large numbers of observations (e.g., at minute-level aggregation), $f$ can be learned using a local regression, linear regression, and/or quadratic regression model.

In turn, analysis apparatus 204 uses the example model representations above to compute $E[l_t]=f(g(t))$, $\sigma_t=SD(f(g(t)))$ for each timestamp t and calculates a severity score of $s(e, t_1, t_2)$ for a time interval $[t_1, t_2]$. After severity scores 210 are calculated for all relevant components within the same time interval, analysis apparatus 204 is able to rank the components by severity scores 210 and/or filter components with low severity scores (e.g., $s(e, t_1, t_2) < \varepsilon$) from potential root causes 220 of performance issues 116.

In one or more embodiments, analysis apparatus 204 includes functionality to generate weighted severity scores 212 for the components from severity scores 210 and measures of the components' importance in call graph 214. Continuing with the example model representations above, analysis apparatus 204 calculates a weighted severity score for a component using the following equation:

$$h(e) = s(e) * c(e)$$

In the above equation, h(e) represents a weighted severity score for component e, which is calculated by multiplying the severity score s(e) of the component with a criticality weight c(e) for the component.

More specifically, analysis apparatus 204 calculates the weighted severity score for a given component e by scaling the severity score of the component by the relative importance of the component in call graph 214. For example, analysis apparatus 204 uses the following equation to calculate the criticality weight:

$$c(e) = \frac{1-d}{N} + d \sum_{e_j \in N(e)} \frac{c(e_j)}{d(e_j)},$$

where N represents the total number of components or nodes in call graph 214, d is a user-specified dampening factor, N(e) represents the set of components that call component e, and d(e) represents the sum of the weights of edges in call graph 214 from N(e) to e. Criticality weights are optionally calculated by another component and/or stored with an up-to-date representation of call graph 214 in data repository 234 and/or another data store. In turn, analysis apparatus 204 queries the data stores for the criticality weights and uses the criticality weights to generate weighted severity scores 212 for the components.

In some embodiments, analysis apparatus 204 includes functionality to aggregate severity scores 212 associated with different types of performance metrics 114 for each component in the target fabric. For example, analysis apparatus 204 uses one or more machine learning models 208 to calculate individual severity scores 212 for the latency and error count of each service endpoint. Analysis apparatus 204 also, or instead, uses one or more machine learning models 208 to calculate individual severity scores 212 for the thread pool usage, CPU usage, memory usage, garbage collection count, and garbage collection time of each service. Analysis apparatus 204 then applies a ranking model to a feature vector that includes the maximum latency among endpoints of each service, the total error count of the endpoints, the thread pool utilization of the service, the garbage collection count of the service, the garbage collection time of the service, the CPU utilization of the service, and the memory utilization of the service to generate a ranking score for the service. The ranking score is then used as a final or overall severity score for the component, or the ranking score is used to generate a weighted severity score at the service level (e.g., by multiplying the ranking score with an aggregate representation of severity scores 210 or weighted severity scores 212 for endpoints or other components associated with the service).

Continuing with the above example, the ranking model includes a linear regression model with the following form:

$$\phi(d) = w^T d,$$

where w is a vector containing parameters of the linear regression model and d is the feature vector.

The ranking model also, or instead, includes a tree-based model with the following form:

$$\phi(d) = \sum_{k=1}^{K} f_k(d), f_k \in \mathcal{F},$$

where $\mathcal{F} = \{f(d) = w_{q(d)}\}(q: \mathbb{R}^D \to T, w \in \mathbb{R}^T)$ is the space of regression trees and T is the number of leaves in each tree.

Continuing with the above example, the ranking model is trained using a pairwise loss function. More specifically, services are assigned labels of −1 for non-root causes of performance issues 116 and labels of +1 for root causes 220 of performance issues 116. For each load test, pairs of services $d_i$ and $d_j$ are selected to have different labels, with $d_i \triangleright d_j$ denoting that $d_i$ should be ranked higher than $d_j$ (e.g., because $d_i$ is labeled as a root cause of performance issues 116 and $d_j$ is not). The probability of this event is defined using the following sigmoid function:

$$P_{ij} \equiv P(d_i \triangleright d_j) = \frac{1}{1+e^{-\sigma(\phi(d_i)-\phi(d_j))}}$$

where σ is a parameter that controls the shape of the sigmoid function. The parameters of the ranking model are then updated using a cross-entropy cost function C that penalizes the deviation of the output probabilities $P_{ij}$ from the desired probabilities $\overline{P}_{ij}$:

$$C = -\overline{P}_{ij} \log P_{ij} - (1-\overline{P}_{ij})\log(1-P_{ij}).$$

In some embodiments, analysis apparatus 204 identifies root causes 220 of performance issues 116 based on groupings of severity scores 210 and/or weighted severity scores 212 by call paths 216 in call graph 214. First, analysis apparatus 204 identifies a subset of components with the highest severity scores 210 and/or weighted severity scores 212 associated with a given load test of the target fabric. For example, analysis apparatus 204 identifies the subset of components as a pre-specified number (e.g., 100) of components with the highest severity scores 210 and/or weighted severity scores 212 and/or a variable number of components with severity scores 210 and/or weighted severity scores 212 that exceed a threshold.

After components with high severity scores 210 and/or high weighted severity scores 212 are identified, analysis apparatus 204 groups the components and/or corresponding scores by call paths 216 in call graph 214. Each call path includes one or more components that are connected by a series of calls in the target fabric. For example, each call path in call graph 214 includes a call that starts at a frontend service of an online system and ends in a backend service of the online system. Because a given call path represents a chain of dependencies among a set of services, performance metrics 114, severity scores 210, and/or weighted severity scores 212 of the services are likely to be correlated. In other words, if a given service experiences abnormally high latency and/or other performance degradation during a load test, other services that depend on the service are also likely to exhibit abnormal behavior and/or have high severity score 210 and/or weighted severity scores 212.

In one or more embodiments, analysis apparatus 204 selects, from the subset components identified as having high severity scores 210 and/or weighted severity scores 212, one or more components with the highest severity scores 210 and/or weighted severity scores 212 in each call path as potential root causes 220 of performance issues 116. For example, analysis apparatus 204 removes, from call graph 214, components that are not associated with the top 100 severity scores 210 and/or weighted severity scores 212. Next, analysis apparatus 204 selects, from remaining components in each call path, a single component with the highest severity score and/or weighted severity score as a potential root cause of performance issues 116 in the target fabric. When two or more components in the same call path have the same highest severity score and/or weighted severity score, analysis apparatus 204 selects the most downstream component in the call path as a potential root cause of performance issues 116 in the target fabric. Analysis apparatus 204 also, or instead, selects one or more components as potential root causes 216 of performance issues 116 based on known patterns associated with performance issues 216 in the components, services, and/or target fabric. Analysis apparatus 204 also, or instead, identifies the last component in a given call path (i.e., the most downstream component) as a potential root cause of performance issues 116, even if the component does not have the highest severity score and/or weighted severity score in the call path.

Analysis apparatus 204 further calculates a grouped severity score for the component identified as the potential root cause of performance issues 116 in a given call path based on severity scores 210 and/or weighted severity scores 212 of all components in the call path. For example, analysis apparatus 204 combines severity scores 210 and/or weighted severity scores 212 of the components in the call path into a sum, average, and/or other aggregated value and replaces the severity score and/or weighted severity score of the component with the aggregated value. If a given component is identified as the potential root cause of performance issues 116 in multiple call paths, analysis apparatus 204 calculates a grouped severity score from severity scores 210 and/or weighted severity scores 212 of components in each of the call paths and sets the severity score of the component to the highest grouped severity score calculated from the call paths.

Analysis apparatus 204 also includes functionality to assign severity scores 210 and/or weighted severity scores 212 on the service level based on aggregations of severity scores 210 and/or weighted severity scores 212 associated with endpoints and/or other components in the services. For example, analysis apparatus 204 sets the severity score of a service in the target fabric to the highest severity score and/or weighted severity score associated with an endpoint for the service.

After analysis apparatus 204 identifies components and/or services that are likely to cause performance bottlenecks, failures, outages, and/or other performance issues 116 in the target fabric, management apparatus 206 outputs the identified components and/or services and associated severity scores 210 and/or weighted severity scores 212 in a user interface 202. In some embodiments, user interface 202 includes a dashboard 222 that allows SREs and/or owners of the services to view performance metrics 114, severity scores 210, weighted severity scores 212, and/or other measures of performance, capacity, and/or fault tolerance in the services and/or components. Dashboard 222 also, or instead, includes a list of services, endpoints, and/or components that are identified by analysis apparatus 204 as potential root causes 220 of performance issues 116 in the target fabric (e.g., based on one or more severity scores 210 and/or weighted severity scores 212 associated with the services, endpoints, and/or components). Dashboard 222 also, or instead, includes performance metrics 114, severity scores 210, and/or weighted severity scores 212 associated with the services, endpoints, and/or components. Dashboards for identifying potential root causes of performance issues in target fabrics are described in further detail below with respect to FIG. 3.

In some embodiments, user interface 202 and/or dashboard 222 include one or more reports 224 associated with load tests of target fabrics. Each report includes a list of services and/or components of the services, as well as performance metrics 114, severity scores 210, weighted severity scores 212, and/or other measures of performance, capacity, or fault tolerance associated with the services and/or components. SREs, service owners, and/or other users are able to review the report and identify performance issues 116 based on known and/or historical patterns or behavior in the corresponding services, components, and/or target fabrics.

By calculating severity scores for services based on deviations from normal behavior experienced during a load test, the disclosed embodiments identify performance issues in the services without requiring administrators or site reliability engineers (SREs) to manually review performance metrics for the services. The disclosed embodiments additionally group the services (or service endpoints) by call paths in a call graph and select individual services with the worst performance issues in each call path, thereby reducing false positives during root cause analysis of the performance issues. In turn, owners of the services are able to remedy latency, capacity, and/or other performance issues identified in the services, which improves the efficiency and performance of the services, other services in the same call paths, and/or computer systems or resource used to execute the services. Consequently, the disclosed embodiments improve computer systems, applications, user experiences, tools, and/or technologies related to load testing, capacity monitoring, root cause analysis, and/or managing or maintaining distributed services or systems.

Those skilled in the art will appreciate that the system of FIG. 2 may be implemented in a variety of ways. First, analysis apparatus 204, management apparatus 206, and data repository 234 may be provided by a single physical machine, multiple computer systems, one or more virtual machines, a grid, one or more databases, one or more filesystems, and/or a cloud computing system. Analysis apparatus 204 and management apparatus 206 may additionally be implemented together and/or separately by one or more hardware and/or software components and/or layers.

Second, a number of techniques may be used to determine severity scores 210, weighted severity scores 212, root causes 220, and/or other output of the system. For example, the functionality of machine learning models 208 and/or analysis apparatus 204 may be provided by artificial neural networks, support vector machines, decision trees, random forests, gradient boosted trees, regression models, Bayesian models, Kalman filters, deep learning models, hierarchical models, clustering technique, and/or ensemble models. The retraining or execution of each machine learning model may be performed on an offline, online, and/or on-demand basis to accommodate requirements or limitations associated with the processing, performance, or scalability of the system and/or the availability of features used to train the machine learning model. Multiple versions of a machine learning model may be adapted to different target fabrics, services, components, and/or call paths 216, or the same machine learning model may be used to predict severity scores 210, weighted severity scores 212, and/or root causes 220 for all services, components, fabrics, and/or call paths 216.

Figure 3:
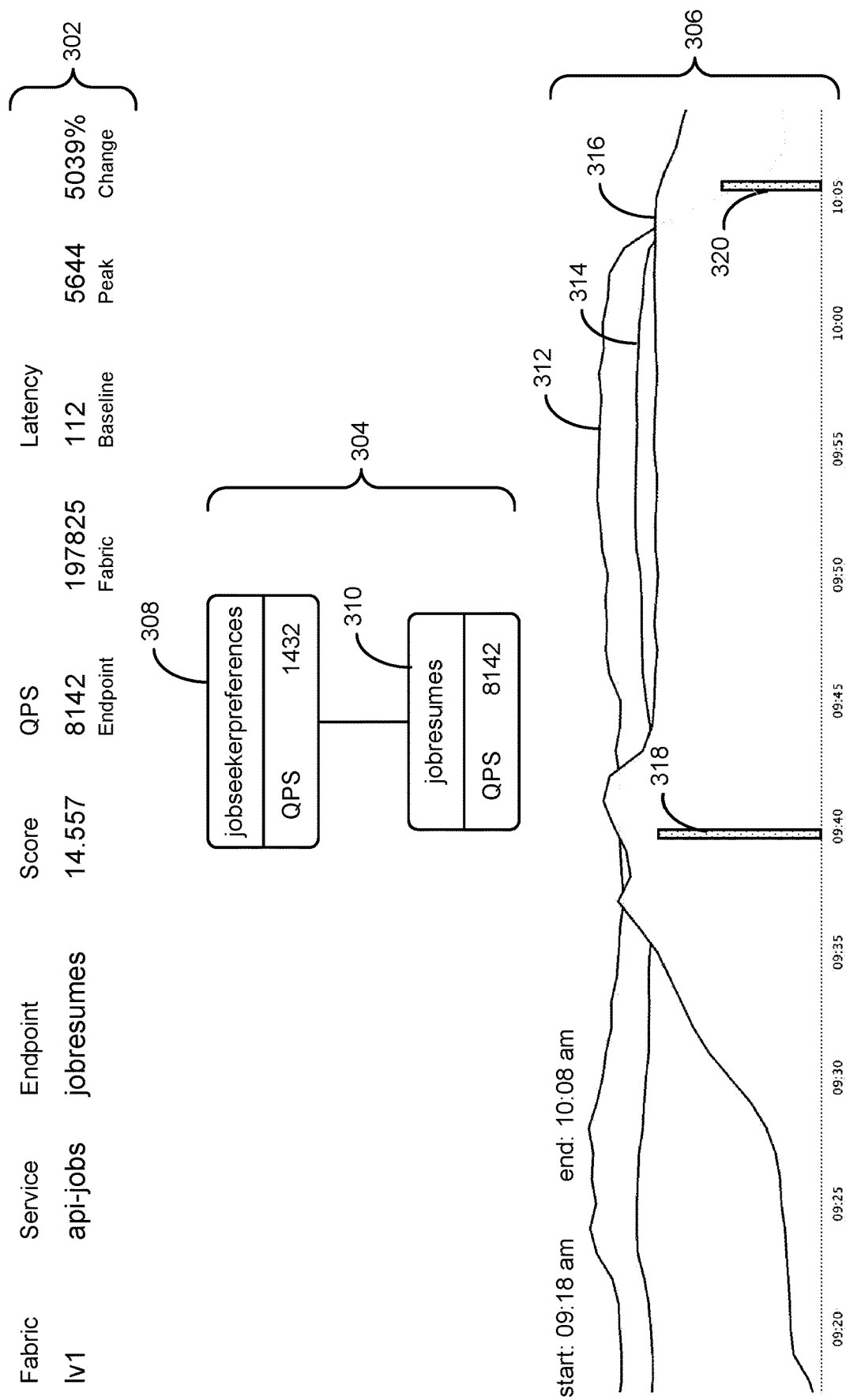
FIG. 3 shows an example screenshot in accordance with the disclosed embodiments.

FIG. 3 shows an example screenshot in accordance with the disclosed embodiments. More specifically, FIG. 3 shows a screenshot of a dashboard for identifying and analyzing performance issues, such as dashboard 222 of FIG. 2. The dashboard includes a first portion 302 that displays attributes related to a service endpoint identified as a potential root cause of performance issues, a second portion 304 that displays a call graph associated with the component, and a third portion 306 that displays a plot of metrics 312-320 collected during a load test of the endpoint and other endpoints in a given target fabric.

As shown in FIG. 3, portion 302 includes a fabric name of "1v1" for the target fabric, a service name of "api-jobs" for the service to which the endpoint belongs, and an endpoint name of "jobresumes" for the endpoint. Portion 302 also includes a severity score of 14.557, an average QPS of 8142 for the endpoint, and an average QPS of 197825 for a site on which the endpoint runs, as determined using the load test. Portion 302 further includes a baseline latency of 112 ms for the endpoint, a peak latency of 5644 ms for the endpoint, and a difference of 5039% between the baseline latency and the peak latency during the load test. As a result, portion 302 allows an SRE, service owner, and/or other user to match a given service, endpoint, and fabric to a corresponding severity score, QPSes, and latencies.

The call graph in portion 304 includes a call path representing a calling relationship between a first node 308 representing a first endpoint and a second node 310 representing a second endpoint that is "downstream" from the first endpoint (e.g., an endpoint that is in a chain of calls starting at the first endpoint). Node 308 includes an endpoint name of "jobseekerpreferences" and a QPS of 1432, and node 310 includes an endpoint name of "jobresumes" and a QPS of 8142. Within portion 304, node 310 represents the endpoint described in portion 302, and node 308 represents a different endpoint that depends on the endpoint described in portion 302, which is also identified as a potential root cause of performance issues in the same target fabric. To expedite analysis and/or resolution of performance degradation and/or issues in the target fabric, the call graph omits endpoints and/or components that are not identified from the load test as potential root causes of performance issues.

Portion 306 includes a plot of metrics 312-320 collected from the endpoint over the duration of the load test, which spans the times of 9:18 am to 10:08 am. Metric 312 represents a QPS of the fabric during the load test, metric 314 represents a QPS of the endpoint during the load test, and metric 316 represents a $95^{th}$ percentile latency of the endpoint during the load test. Metric 318 represents a non-zero error count at around 9:40 am during the load test, and metric 320 represents a lower non-zero error count at around 10:05 am during the load test. As a result, portion 306 allows the user to track the performance of the endpoint over the load test and/or correlate changes in the performance with other events or metrics.

Figure 4:
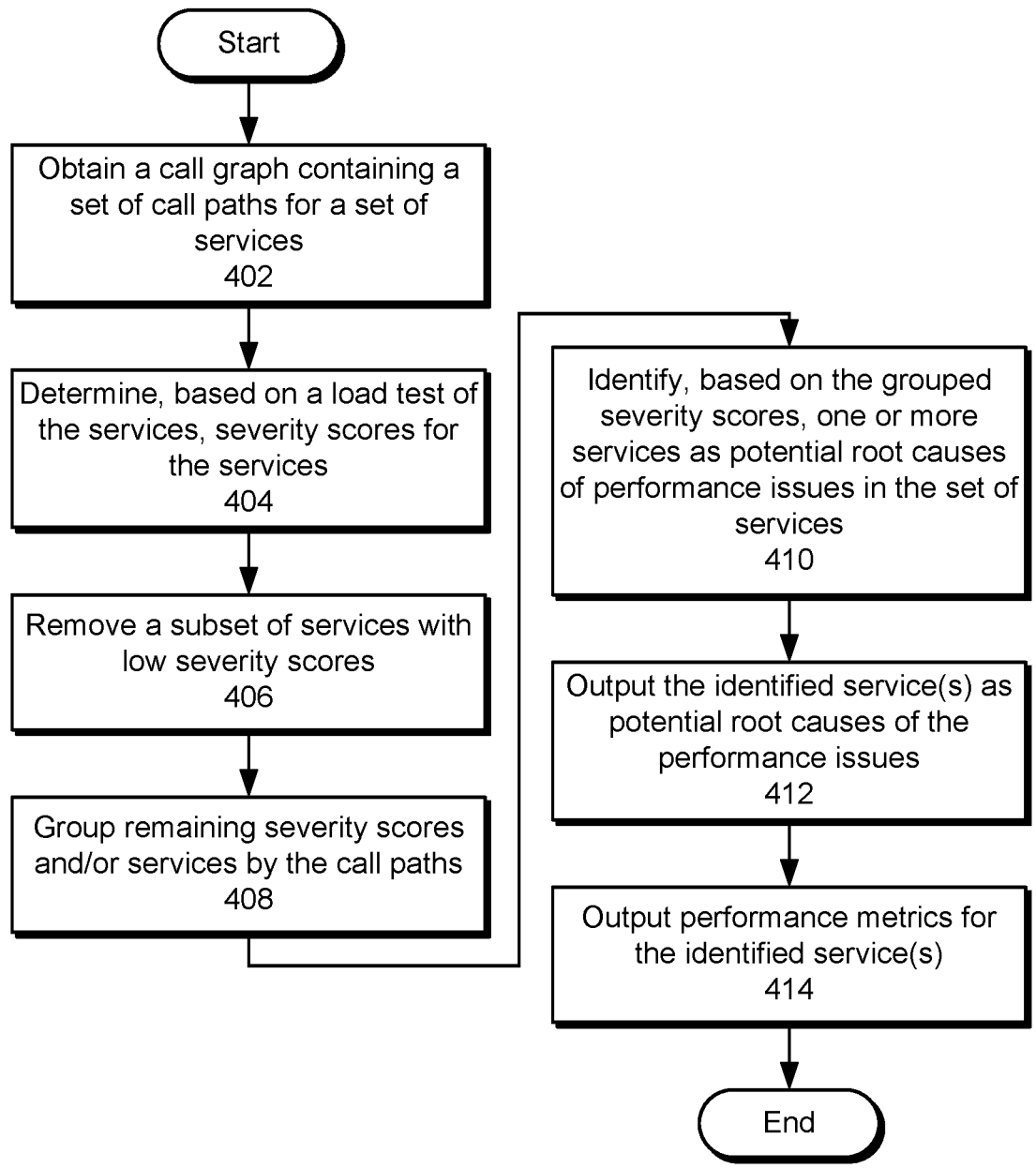
FIG. 4 shows a flowchart illustrating a process of identifying root causes of performance issues in accordance with the disclosed embodiments.

FIG. 4 shows a flowchart illustrating a process of identifying root causes of performance issues in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a call graph containing a set of call paths for a set of services is obtained (operation 402). For example, the call graph is obtained from a component that monitors service calls among the services. The call graph includes a calling service, a calling endpoint, a called service, a called endpoint and/or a QPS.

Next, severity scores for the services are determined based on a load test of the services (operation 404). For example, the load test is performed by shifting traffic to the set of services from one or more fabrics to a target fabric and monitoring performance metrics for the services in the target fabric. After the load test is complete, one or more machine learning models are used to calculate a severity score for each service (and/or each component of the service) based on a difference between an observed performance of the service during the load test and a baseline performance of the service. The severity score is optionally adjusted based on an importance of the service in the call graph. In another example, individual severity scores are calculated for a set of performance metrics associated with the service. The performance metrics include the latency and/or error count of one or more endpoints of the service and/or a thread pool usage, processor usage, memory usage, garbage collection count, and/or garbage collection time for the service. A ranking model is then applied to the individual severity scores to produce an overall severity score for the service.

A subset of services with low severity scores is removed (operation 406), and remaining severity scores and/or services are grouped by the call paths (operation 408). For example, a pre-specified number of services with highest severity scores and/or a variable number of services with severity scores that exceed a threshold are identified, and the call graph is updated to include the identified services and omit services with lower severity scores. Remaining services in each call path of the updated call graph are then identified, and a grouped severity score for the call path is calculated as an aggregation (e.g., summation, average, etc.) of severity scores associated with nodes in the call path.

One or more services are identified as potential root causes of performance issues in the set of services based on the grouped severity scores (operation 410). For example, a node (e.g., service, endpoint, component, etc.) with the highest severity score in each call path is identified as a potential root cause of the performance issues. When multiple nodes in the same call path have the same highest severity score, a downstream node is selected from the multiple nodes as the potential root cause of the performance issues. The selected node is then assigned an updated severity score that is equal to the grouped severity score for the call path.

The identified service(s) are outputted as potential root causes of the performance issues (operation 412), along with performance metrics for the identified service(s) (operation 414). For example, names, endpoint names, and/or other attributes of the service(s) are outputted in a user interface, dashboard, and/or report, along with performance metrics such as latencies, error counts, thread pool usages, processor usages, memory usages, garbage collection counts, and/or garbage collection times of the services and/or endpoints. In another example, a service is assigned a severity score that is equal to the highest severity score found among multiple components (e.g., endpoints) associated with the service, and the severity score is outputted with the name of the service. In a third example, services, endpoints, and/or other components identified as potential root causes of performance issues are displayed by decreasing severity score to allow users to address the performance issues before additional performance degradation, failures, and/or outages occur.

Figure 5:
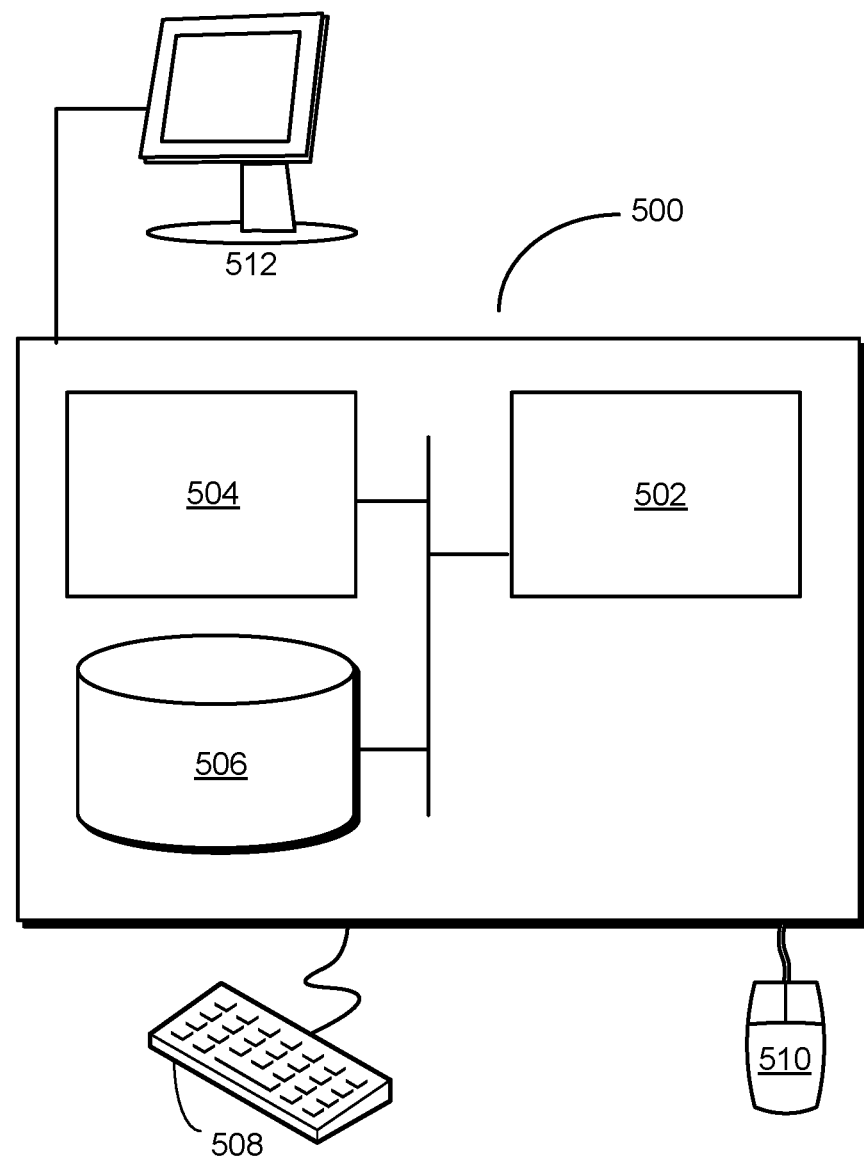
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 also includes input/output (I/O) devices such as a keyboard 508, a mouse 510, and a display 512.

Computer system 500 includes functionality to execute various components of the present embodiments. In particular, computer system 500 includes an operating system (not shown) that coordinates the use of hardware and software resources on computer system 500, as well as one or more applications that perform specialized tasks for the user. To perform tasks for the user, applications obtain the use of hardware resources on computer system 500 from the operating system, as well as interact with the user through a hardware and/or software framework provided by the operating system.

In one or more embodiments, computer system 500 provides a system for identifying root causes of performance issues. The system includes an analysis apparatus and a management apparatus, one or more of which may alternatively be termed or implemented as a module, mechanism, or other type of system component. The analysis apparatus obtains a call graph containing a set of call paths for a set of services. Next, the analysis apparatus determines, based on a load test of the set of services, severity scores for the set of services, wherein the severity scores represent levels of abnormal behavior in the set of services. The analysis apparatus then groups the severity scores by the set of call paths and identifies, based on the grouped severity scores, one or more services as potential root causes of performance issues in the set of services. Finally, the management apparatus outputs the identified one or more services as the potential root causes of the performance issues.

In addition, one or more components of computer system 500 may be remotely located and connected to the other components over a network. Portions of the present embodiments (e.g., analysis apparatus, management apparatus, data repository, online network, etc.) may also be located on different nodes of a distributed system that implements the embodiments. For example, the present embodiments may be implemented using a cloud computing system that identifies root causes of performance issues in a set of remote services and/or fabrics.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    obtaining a call graph comprising a set of call paths for a set of services;
    determining, by one or more computer systems based on a load test of the set of services, severity scores for the set of services, wherein the severity scores represent levels of abnormal behavior in the set of services;
    grouping, by the one or more computer systems, the severity scores by the set of call paths;
    identifying, by the one or more computer systems based on the severity scores, one or more services as potential root causes of performance issues in the set of services; and
    outputting an identity for each service of the ore more services as the potential root causes of the performance issues.

2. The method of claim 1, further comprising:
    removing a subset of services with low severity scores from the set of call paths prior to grouping the severity scores by the set of call paths.

3. The method of claim 1, wherein determining the severity scores comprises:
    calculating a severity score for a service based on a difference between an observed performance of the service during the load test and a baseline performance of the service; and
    adjusting the severity score based on an importance of the service in the call graph.

4. The method of claim 3, wherein calculating the severity score for the service comprises:
    calculating individual severity scores for a set of performance metrics associated with the service; and
    applying a ranking model to the individual severity scores to produce an overall severity score for the service.

5. The method of claim 4, wherein the set of performance metrics comprises at least one of:
    a latency;
    an error count;
    a thread pool usage;
    a processor usage;
    a memory usage;
    a garbage collection count; or
    a garbage collection time.

6. The method of claim 1, wherein grouping the severity scores by the set of call paths comprises:
    calculating a grouped severity score for a call path based on an aggregation of a subset of the severity scores associated with nodes in the call path.

7. The method of claim 1, wherein identifying, based on the severity scores, one or more services as potential root causes of performance issues in the set of services further comprises:
    for each call path in the set of call paths, identifying a node with a highest severity score in the call path as a potential root cause of the performance issues; and
    when multiple nodes in the call path have the highest severity score, selecting a downstream node in the multiple nodes as the potential root cause of the performance issues.

8. The method of claim 1, wherein identifying, based on the severity scores, one or more services as potential root causes of performance issues in the set of services comprises:
    assigning a severity score to a service comprising multiple components based on the highest severity score associated with the multiple components.

9. The method of claim 1, further comprising:
    outputting a set of performance metrics for the one or more services.

10. The method of claim 1, wherein the load test of the set of services comprises:
    shifting traffic associated with the set of services from one or more fabrics to a target fabric; and
    monitoring performance metrics for the set of services in the target fabric.

11. The method of claim 1, wherein the call graph comprises:
    a calling service;
    a calling endpoint;
    a called service;
    a called endpoint; and
    a queries per second (QPS).

12. A system, comprising:
    one or more processors; and
    memory storing instructions that, when executed by the one or more processors, cause the system to:
        obtain a call graph comprising a set of call paths for a set of services;
        determine, based on a load test of the set of services, severity scores for the set of services, wherein the severity scores represent levels of abnormal behavior in the set of services;
        group the severity scores by the set of call paths;
        identify, based on the severity scores, one or more services as potential root causes of performance issues in the set of services; and
        output an identity for each service of the one or more services as the potential root causes of the performance issues.

13. The system of claim 12, wherein the memory further stores instructions that, when executed by the one or more processors, cause the system to: remove a subset of services with low severity scores from the set of call paths prior to grouping the severity scores by the set of call paths.

14. The system of claim 12, wherein determining the severity scores comprises:
    calculating a severity score for a service based on a difference between an observed performance of the service during the load test and a baseline performance of the service; and
    adjusting the severity score based on an importance of the service in the call graph.

15. The system of claim 14, wherein calculating the severity score for the service comprises:
    estimating a normal traffic associated with the service using a first machine learning model;
    applying a second machine learning model to the estimated normal traffic to generate a baseline performance metric for the service; and
    calculating a severity score for a service based on a difference between an observed performance metric of the service during the load test and the baseline performance metric for the service.

16. The system of claim 14, wherein calculating the severity score for the service comprises:
    calculating individual severity scores for a set of performance metrics associated with the service; and
    applying a ranking model to the individual severity scores to produce an overall severity score for the service.

17. The system of claim 12, wherein identifying, based on the severity scores, one or more services as potential root causes of performance issues in the set of services further comprises:

for each call path in the set of call paths, identifying a node with a highest severity score in the call path as a potential root cause of the performance issues; and when multiple nodes in the call path have the highest severity score, selecting a downstream node in the multiple nodes as the potential root cause of the performance issues.

18. The system of claim 12, wherein the memory further stores instructions that, when executed by the one or more processors, cause the system to:

output a set of performance metrics for the one or more services.

19. The system of claim 18, wherein the set of performance metrics comprises at least one of:

a latency;

an error count;

a thread pool usage;

a processor usage;

a memory usage;

a garbage collection count; or a garbage collection time.

20. A non-transitory computer-readable storage medium storing instructions that when executed by a computer cause the computer to perform a method, the method comprising:

obtaining a call graph comprising a set of call paths for a set of services;

determining, based on a load test of the set of services, severity scores for the set of services, wherein the severity scores represent levels of abnormal behavior in the set of services;

removing a subset of services with low severity scores from the set of call paths;

grouping the severity scores by the set of call paths;

identifying, based on the severity scores, one or more services as potential root causes of performance issues in the set of services; and outputting an identity for each service of the one or more services as the potential root causes of the performance issues.

\* \* \* \* \*